US010597095B2

(12) United States Patent
Hamilton et al.

(10) Patent No.: US 10,597,095 B2
(45) Date of Patent: Mar. 24, 2020

(54) SEMI-ACTIVE SUSPENSION CONTROLS (71) Applicant: AGCO Corporation, Duluth, GA (US)

(72) Inventors: Kevin J Hamilton, Hesston, KS (US);
Daniel Soldan, Hesston, KS (US)

(73) Assignee: AGCO Corporation, Duluth, GA (US)

(*) Notice: Subject to any disclaimer, the term of this patent is extended or adjusted under 35 U.S.C. 154(b) by 127 days.

(21) Appl. No.: 15/656,265

(22) Filed: Jul. 21, 2017

(65) Prior Publication Data
US 2018/0022402 A1 Jan. 25, 2018

Related U.S. Application Data (60) Provisional application No. 62/365,445, filed on Jul. 22, 2016.

(51) Int. Cl.
| B62D 33/06 | (2006.01) |
| B60N 2/50 | (2006.01) |
| A01D 67/04 | (2006.01) |
| A01D 43/06 | (2006.01) |
| A01D 34/412 | (2006.01) |
| G01S 19/42 | (2010.01) |
| A01D 41/14 | (2006.01) |

(52) U.S. Cl.
CPC ......... *B62D 33/0604* (2013.01); *A01D 67/04* (2013.01); *B60N 2/501* (2013.01); *B62D 33/0608* (2013.01); *A01D 34/412* (2013.01); *A01D 41/141* (2013.01); *A01D 43/06* (2013.01); *G01S 19/42* (2013.01)

(58) Field of Classification Search
CPC ............ B62D 33/0604; B62D 33/0608; A01D 41/141; A01D 67/04; B60N 2/501

USPC ...................................................... 296/190.07
See application file for complete search history.

(56) References Cited

U.S. PATENT DOCUMENTS

| 5,536,059 | A | * | 7/1996 | Amirouche | ............ | B60N 2/501 |
| | | | | | | 188/266.1 |
| 6,000,703 | A | * | 12/1999 | Schubert | ............ | B60G 17/0165 |
| | | | | | | 180/89.12 |
| 6,070,681 | A | * | 6/2000 | Catanzarite | .......... | B60G 99/008 |
| | | | | | | 180/89.15 |
| 9,968,033 | B2 | * | 5/2018 | Dunn | .................... | A01B 63/008 |
| 2004/0112659 | A1 | * | 6/2004 | Kramer | ................ | B60G 17/015 |
| | | | | | | 180/89.12 |
| 2005/0274557 | A1 | * | 12/2005 | Barta | ................. | B62D 33/0608 |
| | | | | | | 180/89.15 |
| 2009/0125194 | A1 | * | 5/2009 | Haller | .................... | B60N 2/501 |
| | | | | | | 701/48 |
| 2010/0152980 | A1 | * | 6/2010 | Jones | ................. | B62D 33/0608 |
| | | | | | | 701/49 |
| 2010/0276959 | A1 | * | 11/2010 | Jang | .................... | B62D 33/0604 |
| | | | | | | 296/35.1 |
| 2018/0093708 | A1 | * | 4/2018 | Soldan | .................... | B62D 11/24 |

OTHER PUBLICATIONS

UK Intellectual Property Office, International Search Report for related UK Application No. GB1613848.9, dated Feb. 8, 2017.

* cited by examiner

*Primary Examiner* — Jason S Morrow (57) ABSTRACT

In one embodiment, a method comprising dampening movement of a cab supported by a chassis according to at least one dampening component; receiving plural inputs from at least one sensor and a seat suspension system; and based on the received plural inputs, causing an adjustment to the dampening movement of the cab according to the at least one dampening component.

10 Claims, 7 Drawing Sheets

SEMI-ACTIVE SUSPENSION CONTROLS

CROSS REFERENCE TO RELATED APPLICATION

This application claims the benefit of U.S. Provisional Application No. 62/365,445 filed Jul. 22, 2016, which is hereby incorporated by reference in its entirety.

TECHNICAL FIELD

The present disclosure is generally related to agricultural machines and, more particularly, self-propelled rotary windrowers.

BACKGROUND

Self-propelled windrowers equipped with rotary headers can typically operate at high speeds, limited primarily by the load on the engine and the pressure of the hydrostatic header drive system. As industry accepted standards tend toward a given maximum width for headers, gains in productivity rely on faster speeds by which the windrower travels through a field. However, given the variety of operating conditions (e.g., crop conditions, ground conditions, including topology, etc.), operating a windrower at higher speeds is a challenge given the impact on operator comfort.

BRIEF DESCRIPTION OF THE DRAWINGS

Many aspects of certain embodiments of semi-active suspension systems and methods can be better understood with reference to the following drawings. The components in the drawings are not necessarily to scale, emphasis instead being placed upon clearly illustrating the principles of the present systems and methods. Moreover, in the drawings, like reference numerals designate corresponding parts throughout the several views.

DESCRIPTION OF EXAMPLE EMBODIMENTS

Overview

In one embodiment, a method comprising dampening movement of a cab supported by a chassis according to at least one dampening component; receiving plural inputs from at least one sensor and a seat suspension system; and based on the received plural inputs, causing an adjustment to the dampening movement of the cab according to the at least one dampening component.

DETAILED DESCRIPTION

Certain embodiments of a semi-active suspension system and method are disclosed that involve dynamic adjustment of dampening settings for a cab of a windrower (also referred to as a swather). In one embodiment, the semi-active suspension system comprises a cab, at least one dampening component, a chassis with wheels coupled thereto, the cab mounted on the chassis with movement of the cab dampened according to the at least one dampening component, and a control system. In one embodiment, the control system comprises at least one sensor, at least one dampening component, and one or more controllers configured to receive inputs from the at least one sensor and a seat suspension system and provide a control signal to the dampening component (e.g., to a coil, solenoid, or other actuator) based on the received inputs, the control signal causing an adjustment to the dampening movement of the cab according to the at least one dampening component. In effect, the semi-active suspension system receives feedback from the sensor and the seat suspension system as to the condition of the ride (e.g., rough, smooth, etc.), or equivalently, the firmness of the cab suspension, and adjusts the manner of the ride experienced by an operator located in the cab by automatically adjusting settings of the dampening component and optionally settings of seat suspension system.

Digressing briefly, in conventional agricultural machines, the firmness of the suspension is fixed, or in some implementations, the firmness of the seat may be adjusted based on the input from the operator as to the desired ride to be experienced by an operator, which may help in providing the operator with improved comfort, but only for a limited range of dampening movement or conditions and/or for limited effect. In some machines, the suspension may be adjusted based on a position sensor that senses the relative vibration between the cab and the frame, such as found in U.S. Pat. No. 6,070,681. In contrast, certain embodiments of an active suspension system may improve ride comfort for the operator via automatic control of a dampening movement associated with the cab suspension based on inputs from one or more sensors and the seat suspension system, providing an alternative and/or expanded range of dampening effect and more comprehensive control of the ride quality. Further, though semi-active seat suspension control is available on the market today, none are known to work with a semi-active cab suspension.

Having summarized certain features of a semi-active suspension system of the present disclosure, reference will now be made in detail to the description of a semi-active suspension system as illustrated in the drawings. While an example semi-active suspension system will be described in connection with these drawings, there is no intent to limit it to the embodiment or embodiments disclosed herein. For instance, though emphasis is placed on a machine in the agricultural industry, and in particular, a self-propelled windrower with a rotary header drive system, certain embodiments of a semi-active suspension system may be beneficially deployed in other machines (in the same or other industries) where rider comfort is desired. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the windrower looking forwardly. Also, reference to semi-active type control involves monitoring movement of the cab (and seat) and reacting by changing the dampening rates with respect to position in dampener stroke and rate of change. In contrast, active type control refers to use of actuators (e.g., in a dampening component) to control motion in order for the cab to remain stationary while the chassis moves underneath the cab.

Figure 1:
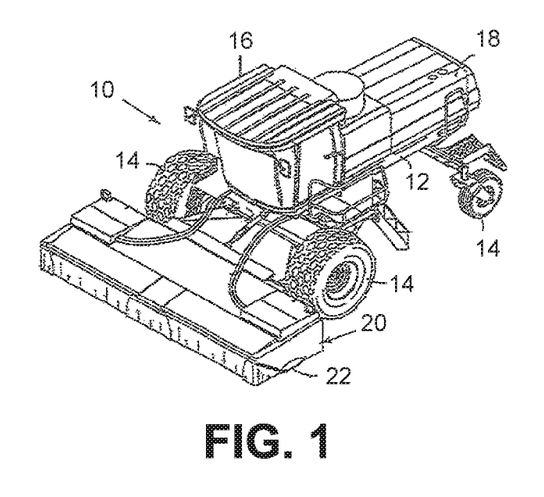
FIG. 1 is a schematic diagram that illustrates, in front perspective view, an example machine in which an embodiment of a semi-active suspension system may be implemented.

Reference is made to FIG. 1, which illustrates an example agricultural machine where an embodiment of a semi-active suspension system may be implemented. One having ordinary skill in the art should appreciate in the context of the present disclosure that the example agricultural machine, depicted in FIG. 1 as a self-propelled windrower 10, is merely illustrative, and that other machines and/or components with like functionality may deploy certain embodiments of a semi-active suspension system in some embodiments. The windrower 10 is operable to mow and collect standing crop in the field, condition the cut material as it moves through the machine to improve its drying characteristics, and then return the conditioned material to the field in a windrow or swath. The windrower 10 may include a chassis or frame 12 supported by wheels 14 (although tracks may be used in some embodiments, or other configurations in the number and/or arrangement of wheels may be used in some embodiments) for movement across a field to be harvested. The chassis 12 supports a cab 16, within which an operator may control certain operations of the windrower 10, and a rearwardly spaced compartment 18 housing a power source (not shown) such as an internal combustion engine. The chassis 12 also supports a ground drive system that, in one embodiment, when powered by the engine, causes differential rotation of the wheels (e.g., increasing the speed of one wheel while decreasing the speed of the opposite wheel) according to a dual path steering mechanism as is known in the art. In some embodiments, other mechanisms for enabling navigation and/or traversal of the field may be used.

A coupled working implement, depicted in FIG. 1 as a harvesting header 20, is supported on the front of the chassis 12 in a manner understood by those skilled in the art. The header 20 may be configured as a modular unit and consequently may be disconnected for removal from the chassis 12. As is also known in the art, the header 20 has a laterally extending crop cutting assembly 22 in the form of a low profile, rotary style cutter bed located adjacent the front of the header 20 for severing crop from the ground as the windrower 10 moves across a field. However, one skilled in the art will understand that other types of crop cutting assemblies 22, such as sickle style cutter beds, may also be used in some embodiments.

The windrower 10 also includes a semi-active suspension system, which may in one embodiment include the chassis 12, the cab 16, one or more controllers, a seat suspension system, one or more suspension control and dampening devices, one or more machine controls (e.g., a hydrostatic header float system), and one or more sensors that monitor, in real time, one or more parameters pertaining to the cab suspension and/or seat suspension, including hydrostatic header float pressure, acceleration/motion, pitch, yaw, roll, vertical oscillations or vibrations, ground speed, etc.), as further described below. The semi-active suspension system enables closed loop, moving average adjustments in dampening (continuously variable levels of firmness or predetermined firmness adjustment values) for the cab and/or seat suspensions based on input(s) from the sensors and/or the seat suspension system, as described further below. Note that in some embodiments, the components that make up the semi-active suspension system may be fewer or greater in quantity, or generally, comprised of collectively different components than the embodiment described above. For instance, in one or more of the below-described embodiments, the cab suspension control functionality (e.g., primary suspension and leveling function) and the cab dampening functionality is combined into a single-packaged unit (e.g., with respective suspension and dampening components), though in some embodiments, separate device packages may be used to host the respective functionality. In some embodiments, the semi-active suspension system may provide for suspension dampening exclusively (e.g., without input from the seat suspension system), and vice versa.

During a harvesting operation, the windrower 10 moves forward through the field with the header 20 lowered to a working height. Crop conditions (e.g., dense, tough, and/or moist crop, etc.) and/or crop type may, depending on the ground speed, impose different movement experienced by an operator during the ride (e.g., different in terms of amplitudes and/or frequency of motion). Likewise, ground conditions (e.g., moist ground, soft ground, etc.), including ground surface topology (e.g., bumpy terrain, smooth terrain), may, depending on the ground speed, impose different motion experienced by an operator during the ride. In other words, changes in crop and/or ground conditions may be encountered by the windrower 10 during operations, which are addressed by certain embodiments of a semi-active suspension system with or without operator intervention to ensure improved riding comfort.

Figure 2A:
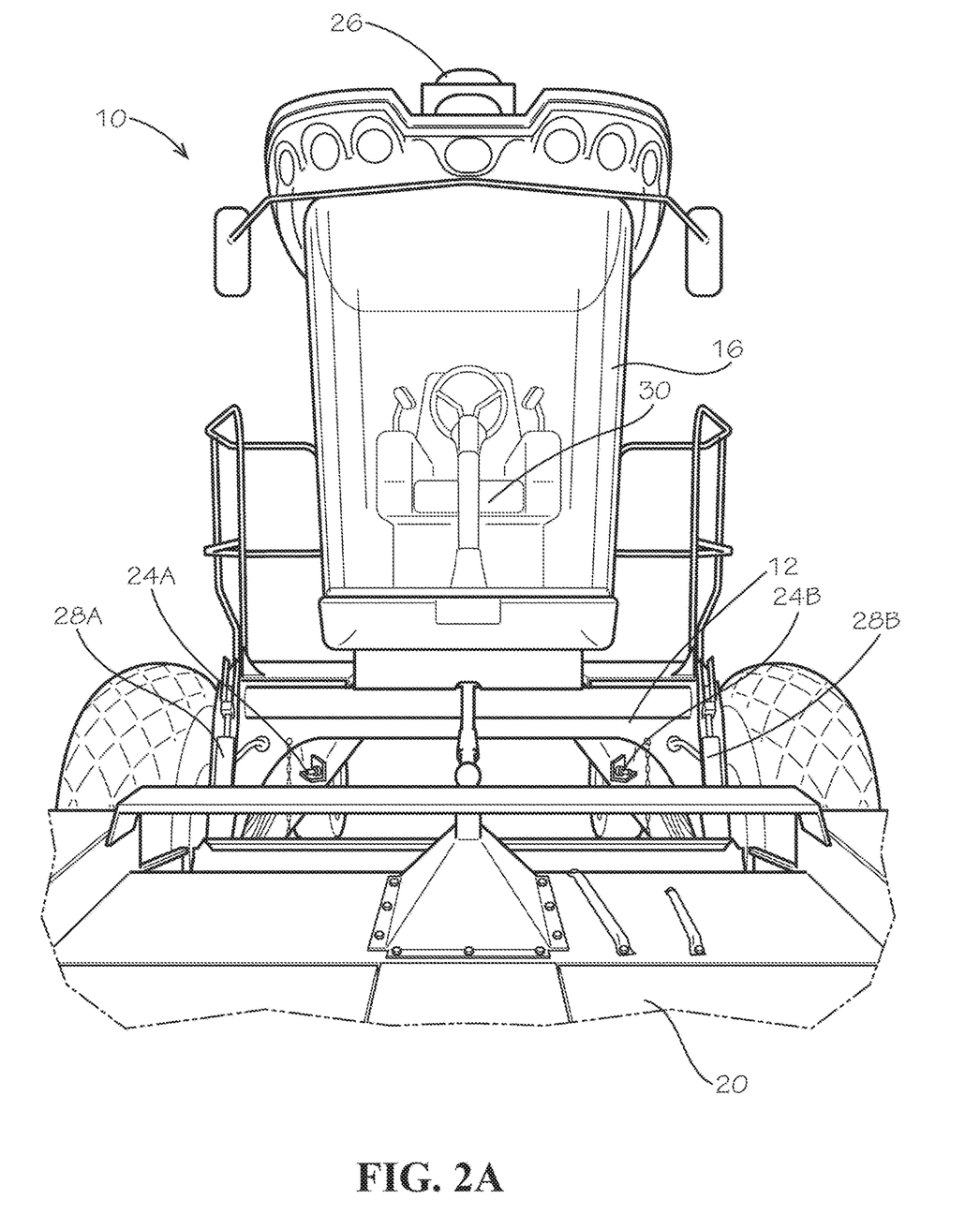
FIG. 2A is a schematic diagram that illustrates, in front elevation view, an example machine in which an embodiment of a semi-active suspension system may be implemented.

Referring now to FIG. 2A, shown is schematic diagram that illustrates, in front elevation view, the example windrower 10 in which an embodiment of a semi-active suspension system may be implemented. The windrower 10 comprises the cab 16. The cab 16 is supported by the chassis 12, with dampening movement of the cab 16 controlled by one or more suspension control and dampening devices 24 (e.g., 24A, 24B). In one embodiment, the suspension control and dampening devices 24 each comprises a suspension control component and a dampening component with respective actuators (e.g., solenoid, coil, air valve, etc.). The suspension control component is configured to provide for the primary suspension and leveling control functionality of the cab 16. The dampening component is configured to provide for the control of the dampening of the motion (e.g., quick accelerations or rate of change in direction) of the cab 16. As indicated previously, in some embodiments, instead of the integration of the suspension control component and the dampening component within a single package, the suspension control component may be embodied as a device that is packaged separately from the dampening component. In one embodiment, the suspension control component comprises an air bag coupled to an actuator (e.g., air leveling or rate valve or solenoid valve), which is coupled to an air source or reservoir. The suspension control component provides for the control of the primary cab suspension and cab leveling according to known suspension control mechanisms. In some embodiments, the suspension control component may operate according to a fixed suspension setting, or be configured for variable operation, as is known. Though described above as an air bag (also known as air spring), in some embodiments, other types of actuable devices may be used, including hydraulic actuators, springs, etc. The dampening component, which controls the dampening rate of the cab, may be embodied as a magnetorheological (MR) fluid dampener, an electrorheological fluid dampener, an electrophoretic fluid dampener, or an adjustable hydraulic fluid dampener. In general, the dampening component comprises an actuable device that varies the dampening rates by changing the viscosity of the fluid disposed therein or by varying the orifice characteristics. For instance, the dampening component is coupled to an actuator (e.g., an integrated or detachable coil, solenoid, etc.), the actuator configured to receive one or more control signals from a controller or controllers (which receives input from one or more sensors and a seat suspension system) and adjusts the dampening rate, to maintain maximum comfort level for the operator in response to changes in, for instance, surface conditions.

The cab 16 further comprises one or more sensors, including a global navigation satellite systems (GNSS) receiver 26. The GNSS receiver 26 (e.g., the inertial measurement unit or IMU) detects motion (e.g., pitch, yaw, roll) of the windrower 10, and provides a signal or signals to the one or more controllers of the semi-active suspension system to effect a counteractive (dampening) motion. In some embodiments, other and/or additional sensors may be used, including one or more accelerometers and/or pressure sensors. For instance, in one embodiment, one or more accelerometers may be used to detect the motion of the chassis 12 and/or cab 16. As another example, a pressure sensor may be used to detect hydraulic fluid pressure at one or both of hydraulic cylinders 28 (e.g., 28A, 28B) of the hydraulic header float system. The hydraulic cylinders 28 are used to raise and lower the header 20.

The cab 16 also comprises a seat 30 which supports an operator. The seat 30 may be embodied as a Grammer Maximo model of seat (or similar) with one or more known features such as electronically-active-controlled, air suspension and electronically-controlled suspension positioning, climate control, air-assisted height adjustment, shock absorbers, fore and aft isolators, adjustable damper, electronic weight adjustment, operator presence switch, and pneumatic lumbar support, among other known-features. It should be noted that the type of seat suspension system used in the seat 30 may be embodied as a passive, active, or semi-active seat suspension system. For instance, in some embodiments, seats that operate according to a semi-active suspension (control) system may be implemented, such as when the seat is embodied as a Sears 5000 series model. In such embodiments, as the vehicle traverses the surface, a position sensor feeds a seat controller of the seat suspension system with real-time changes in surface conditions. The seat controller interprets the conditions and responsively sends electric pulses to, in one embodiment, a magnetorheological (MR)-fluid filled damper of the seat suspension system, which causes a change in the viscosity to update the damping requirements and hence the firmness of the seat suspension. The seat 30 may have firmness controls that enable one of a plurality of firmness profiles to be selected by the operator. The seat suspension system of the seat 30 may communicate the position or firmness to the one or more controllers of the semi-active suspension system, which in turn uses this information to determine a dampening rate adjustment and send one or more control signals to the dampening components of the suspension control and dampening devices 24 to cause adjustment of the existing settings of the dampening components. In some embodiments, the one or more controllers of the semi-active suspension system may use the seat suspension information to provide control signals to both the seat suspension system (e.g., overriding the seat suspension controls or adjusting to coordinate with the cab suspension adjustments) and the dampening components of the suspension control and dampening devices 24. For instance, in one embodiment, the dampening required by the seat suspension system may occur over a frequency and/or amplitude range that is different than the dampening required by the dampening components of the suspension control and dampening devices 24 to dampen movement of the cab 16.

Figure 2B:
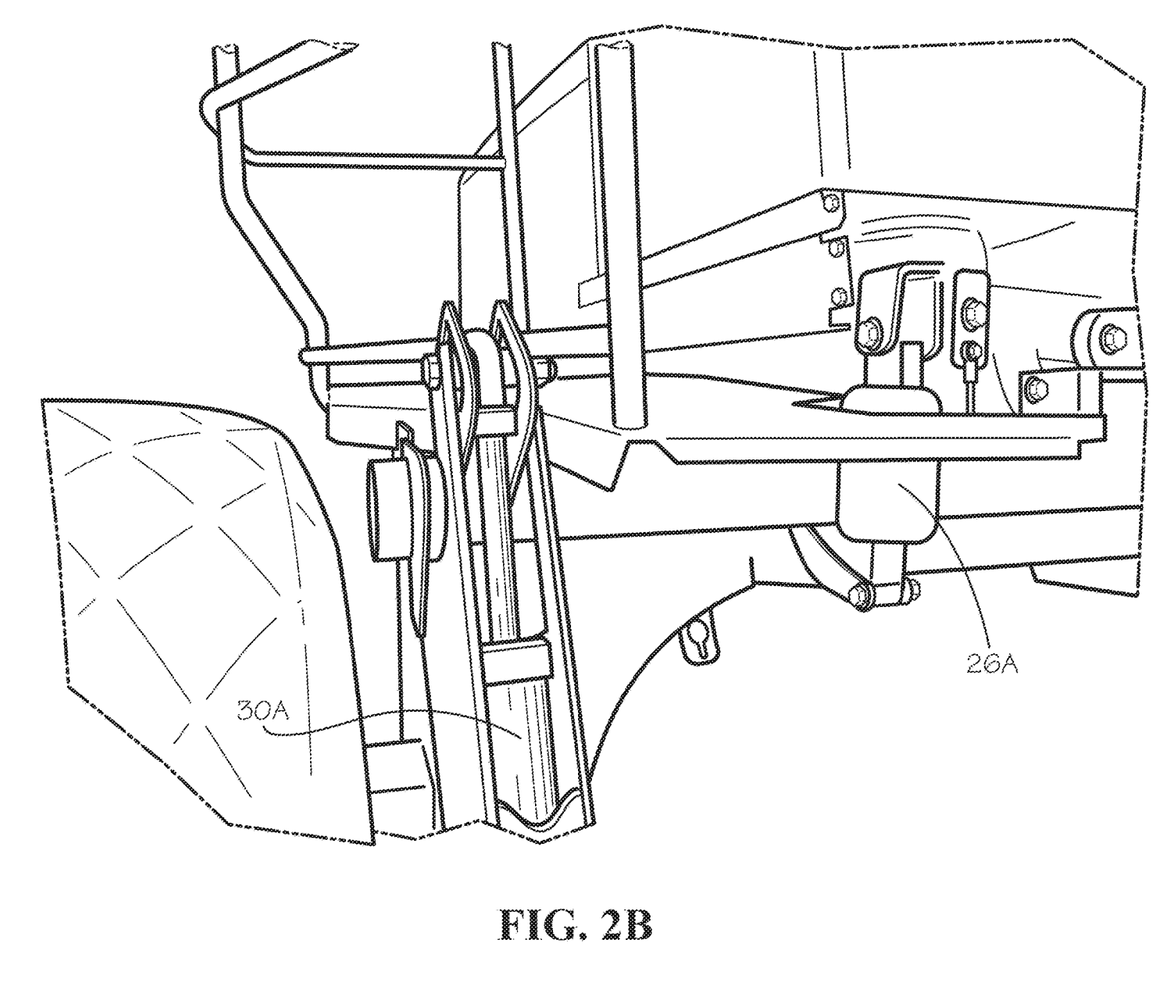
FIG. 2B is a schematic diagram that illustrates, in close-up front elevation view, an example suspension control and an example representation of a dampening device of an embodiment of a semi-active suspension system.

FIG. 2B shows a close-up view of one of the hydraulic cylinders 28A and a representation of one of the suspension control and dampening devices 24A. A pressure sensor may be embodied within the cylinder 28A, or in some embodiments, a position sensor may be mounted proximal to the cylinder 30A. The suspension control and dampening device 24A, as indicated above, comprises a suspension control component (e.g., an air bag) and a dampening component. The following description describes the operation and structure of the dampening component as embodied as a known (MR) fluid dampener, though in some embodiments and as described previously, the dampening component may be based on other known technologies, such as based on the use of electrophoretic fluids (EP), electrorheological fluids (ER), or hydraulic fluids (e.g., semi-active electromechanical). The MR fluid dampener (also known as an MR fluid damper), as is known, comprises in one design version a cylindrical hollow body which is partially closed at one end and fully closed at the other end. A slender rigid piston rod is slidably and sealingly received in an aperture formed within a bushing and sealed by a seal, both of which are supported within end caps at each end. The MR fluid dampener includes an accumulator comprised of a partition, such as a diaphragm, and a gas chamber. The accumulator functions to accommodate the fluid displaced when the piston rod enters into an internal chamber. A fill valve is used to appropriately pressurize the chamber. Other types of accumulators may be used, as are known to those of ordinary skill in the art. The piston assembly separates the internal chamber into first and second fluid chambers. The piston assembly preferably includes an axially extending annular passage through which the controllable fluid, such as an MR fluid may flow. The piston assembly comprises a wear band or wear bands manufactured from an appropriate friction reducing material and of the appropriate diameter to cause the piston assembly to act as a plunger to force MR fluid between the chambers as a consequence of row unit (acceleration) movement. A magnetic field is generated by supplying a control signal to leads of the MR fluid dampener, which electrically interconnect to a circumferentially wound coil supported within the piston assembly. The magnetic field is directed by pole to act across the MR fluid contained within the annular passage, which causes a rheology change (a thickening or apparent viscosity change) which restricts flow of the MR fluid through the passage. If the current is high enough, the flow is stopped altogether, thus substantially locking up the MR fluid dampener and resultantly locking up and preventing further acceleration motion. Notably, the current is preferably rapidly switched from a high current value to a low current value (depending upon the sensor inputs) to accomplish real time changes in dampening. As indicated above, though described above in the context of a particular piston design using MR fluids, other piston configurations and/or fluids may be used, including Electrorheological (ER) fluids or Electrophoretic (EP) fluids or hydraulic (e.g., semi-active configurations) fluids for use in respective types of well-known dampener configurations.

Figure 3:
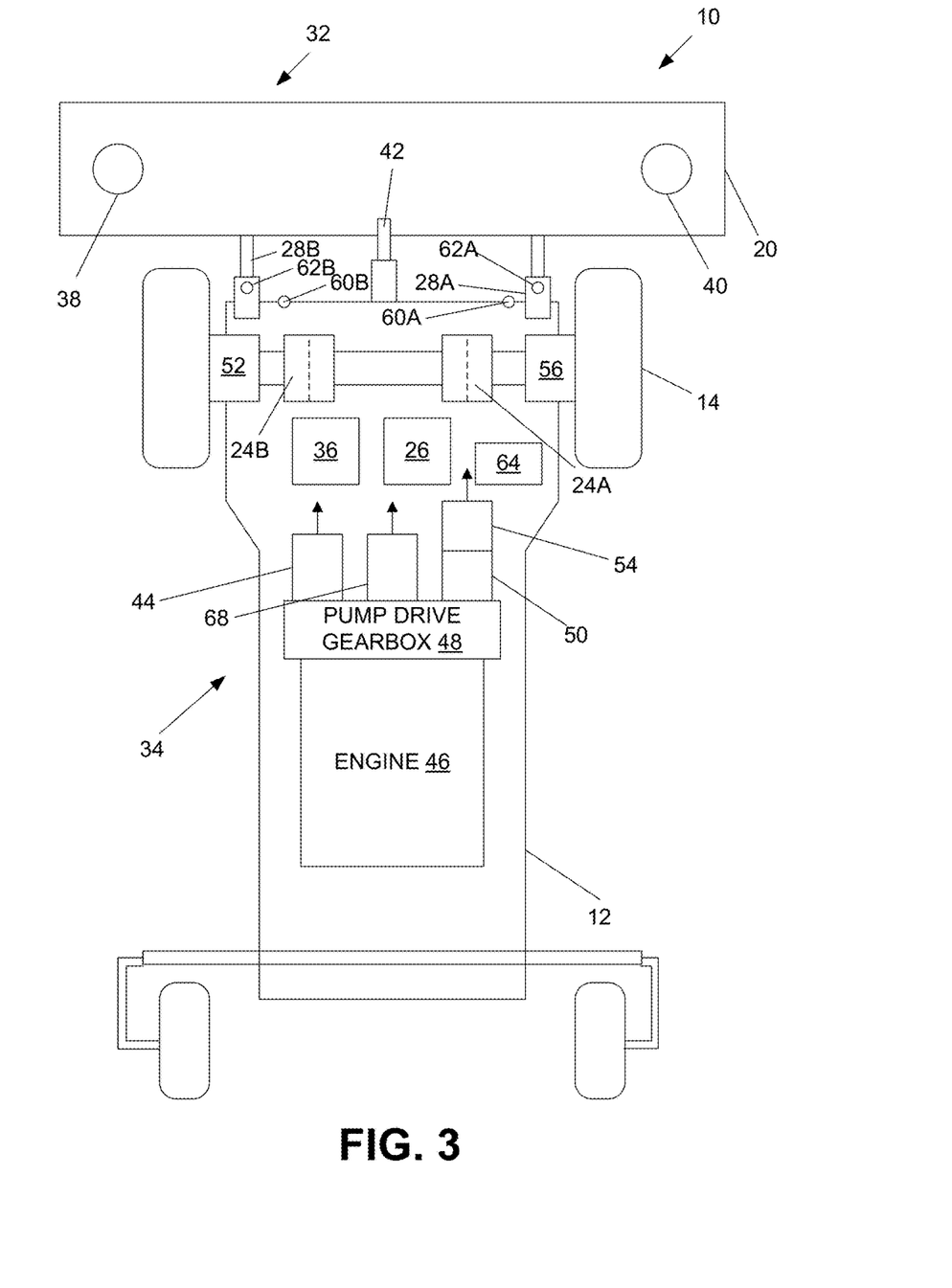
FIG. 3 is a schematic diagram that illustrates an embodiment of a semi-active suspension system of an example machine.

Attention is now directed to FIG. 3, which shows the example windrower 10 in fragmentary, overhead plan (schematic) view. It should be appreciated, within the context of the present disclosure, that the example windrower 10 depicted in FIG. 3 is merely illustrative of one design, and that other designs (or other machines) may likewise provide a suitable environment for embodiments of a semi-active suspension system with beneficial effect. As shown (with certain well-known features omitted for brevity and clarity), the windrower 10 is generally depicted with the header 20 and the chassis 12, which is coupled to the header 20 and to the wheels 14. In one embodiment, the windrower 10 comprises a hydrostatic header drive system 32, a ground drive system 34, and one or more controllers, such as controller 36. In some embodiments, the windrower 10 may comprise additional, fewer, and/or different subsystems. The hydrostatic header drive system 32 comprises header drive motors 38 and 40 (though some embodiments may have fewer or additional motors). Also shown are the hydraulic cylinders 28 (e.g., 28A, 28B), and a center hydraulic cylinder 42, which collectively comprises a header float subsystem. The hydrostatic header drive system 32 and header float sub-system are controlled by a header drive/control pump 44 that is fluidly coupled to the header drive motors 38 and 40 and the hydraulic cylinders 28 via hydraulic fluid lines (not shown, but collectively represented by the single-headed arrow emanating from the pump 44). In some embodiments, additional header drive/control pumps may be deployed. The ground drive system 34 is powered by an engine 46 mounted to the chassis 12, and comprises a pump drive gearbox 48 coupled to the engine 46. The ground drive system 34 further comprises a left wheel propel pump 50 coupled to the pump drive gearbox 48, and further coupled to a left wheel drive motor 52 via hydraulic fluid lines. The ground drive system 34 also comprises a right wheel propel pump 54 coupled to the pump drive gearbox 48, and further coupled to a right wheel drive motor 56 via hydraulic fluid lines. The hydraulic fluid lines from the left and right wheel propel pumps 50, 54 are collectively represented by the single-headed arrow emanating from the pump 54. Although depicted as comprising a by-wire system, other hydraulic mechanisms may be used to facilitate ground transportation in some embodiments, and hence are contemplated to be within the scope of the disclosure.

The windrower 10 also comprises the suspension control and dampening devices 24 (e.g., 24A, 24B, each shown bi-furcated to represent the separate functionality of the dampening component and the suspension control component) coupled to the chassis 12 and to the cab 16 (FIG. 1), and further comprises one or more sensors. For instance, the sensors may include any one or combination of accelerometers 60 (e.g., 60A, 60B) that may be coupled to the cab 16 or chassis 12, the GNSS receiver 26, or pressure sensors 62 (e.g., 62A, 62B). The accelerometers 60 may be disposed proximal to the front of the chassis 12, as depicted in FIG. 3, or elsewhere in the same or different quantities. The pressure sensors 62 may be disposed within, or coupled to, the hydraulic cylinders 28 in the same or different quantities. In some embodiments, the pressure sensors 62 may be replaced with other sensors, such as position sensors. The sensors are coupled to the controller 36 via a wired media (e.g., via a controller area network (CAN) bus or busses), wireless media (e.g., via Bluetooth, 802.11, near-field communications, etc.), or a combination of wired and wireless media. The suspension control and dampening devices 24 are each associated with an actuator, which as noted previously, may comprise a coil, solenoid (e.g., solenoid valve), a rate or air leveling valve, etc. The suspension control and dampening devices 24 are coupled to the controller 36 via a wired and/or wireless medium.

The windrower 10 may also comprise a seat suspension system 64, as explained previously, which is in communication with the controller 36 via a wired and/or wireless medium.

The windrower 10 further comprises a reservoir or source of air (e.g., compressor), designated as air source 68, which may be powered by the pump drive gearbox 48 in one embodiment. The air source 68 provides a supply of air to the suspension control component of the suspension control and dampening devices 24. In some embodiments, the air source 68 may be replaced with a source of other compressible fluid, such as when the suspension control component of the suspension control and dampening devices 24 are based on a compressible fluid other than air.

In one embodiment of a semi-active suspension system operation, software in the controller 36 receives sensor input from one or more of the sensors and feedback (input) from the seat suspension system 64. The sensor input may comprise a voltage or current signal (e.g., digital or analog) comprising or associated with information, such as a parameter corresponding to motion of the cab (e.g., frequency, amplitude, pressure, distance, etc.). The input from the seat suspension system 64 (e.g., as communicated by a controller or I/O of the seat suspension system) may comprise a voltage or current signal (e.g., digital or analog) also comprising or associated with another parameter corresponding to motion of the seat (e.g., frequency, amplitude, actual firmness setting, etc.). The controller 36 determines, based on the inputs from the sensors and the seat suspension system, a dampening value to communicate (via a control signal) to the dampening component of the suspension control and dampening devices 24. The controller 36 may access a data structure, such as a look-up table in memory, to determine the dampening value based on the received parameters. In some embodiments, the controller 36 may use the parameters in a formula to be computed by the controller 36 to determine an optimal or recommended dampening effect to regulate the dampening motion. The dampening value corresponds to a firmness setting that the dampening component of the suspension control and dampening devices 24 uses to adjust the viscosity of the fluid (e.g., in the case of MR dampeners) or orifice characteristics (e.g., hydraulic dampeners), which in turn causes a change in the firmness setting of the suspension control and dampening devices 24. In one embodiment, the firmness adjustment may be a continuously variable adjustment. In one embodiment, the firmness adjustment may be step-wise incremental or according to one selected among a predetermined plurality of firmness settings. As indicated previously, in some embodiments, the controller 36 may collect data (e.g., with parameter values received from the sensors and the seat suspension system 64) over a predetermined window of time or distance traveled, enabling computation of a statistical value for motion (e.g., average, mean, etc.) experienced by the cab 16 and offset by the seat suspension system, which in turn enables a dampening value to be determined based on the statistical motion value. The controller 36 issues a control signal with the dampening value to the dampening component of the suspension control and dampening devices 24 based on the moving average to change the firmness of the ride (by changing the firmness setting of the dampening component (and optionally to cause adjustment of the settings of the seat suspension system 64).

Explaining further, adjustments may be made to the cab suspension and to the seat suspension. For instance, in one embodiment, the controller 36 receives sensor input and data from the seat suspension system 64 (e.g., from a controller or other component in the seat suspension system 64 communicating over a wired or wireless media). The data from the seat suspension system 64 may comprise setting information that conveys to the controller 36 what actions are being taken, or should be taken, by the seat suspension system 64 to address the dampening performed by the seat suspension system 64. The controller 36 may use that information to provide a dampening value to the dampening component of the suspension control and dampening devices 24 that is offset from the dampening performed by the seat suspension system 64, such that the collective dampening performed by the dampening component of the suspension control and dampening devices 24 and the seat suspension system 64 is implemented. In some embodiments, the controller 36 may receive the sensed motion at the seat 30 (FIG. 2A) of the operator and use that data to provide control signals to the dampening component of the suspension control and dampening devices 24 and the seat suspension system 64. For instance, the dampening component of the suspension control and dampening devices 24 are instructed (e.g., by a first dampening value) to cause adjustment of the dampening components as part of the dampening effort for the cab suspension, and the seat suspension system 64 is instructed (e.g., by a second dampening value) to cause an adjustment in the seat firmness (seat suspension) as another part of the dampening effort. In other words, the first and second dampening values are used for the dampening components of the respective suspension control and dampening devices 24 and seat suspension system 64 respectively to cause a total adjustment in the ride experienced by the operator. In some embodiments, the seat suspension system 64 may use the second dampening value as an override to its own generated value, and in some embodiments, the second dampening value may be an offset to the internally generated dampening value computed by the seat suspension system 64 to compensate for the dampening effect implemented by the dampening components of the suspension control and dampening devices 24. In some embodiments, the frequency and/or amplitudes of motion experienced at the seat and by the cab are at different ranges, and the dampening values provided by the controller 36 are used to compensate respectively to those different responses to terrain and/or crop conditions and/or types. In some embodiments, the seat suspension system 64 may be programmed to ignore any external dampening value input, such as from the controller 36. In some embodiments, the cab suspension and seat suspension are controlled independently. In some embodiments, there may be no seat suspension adjustments.

Figure 4A:
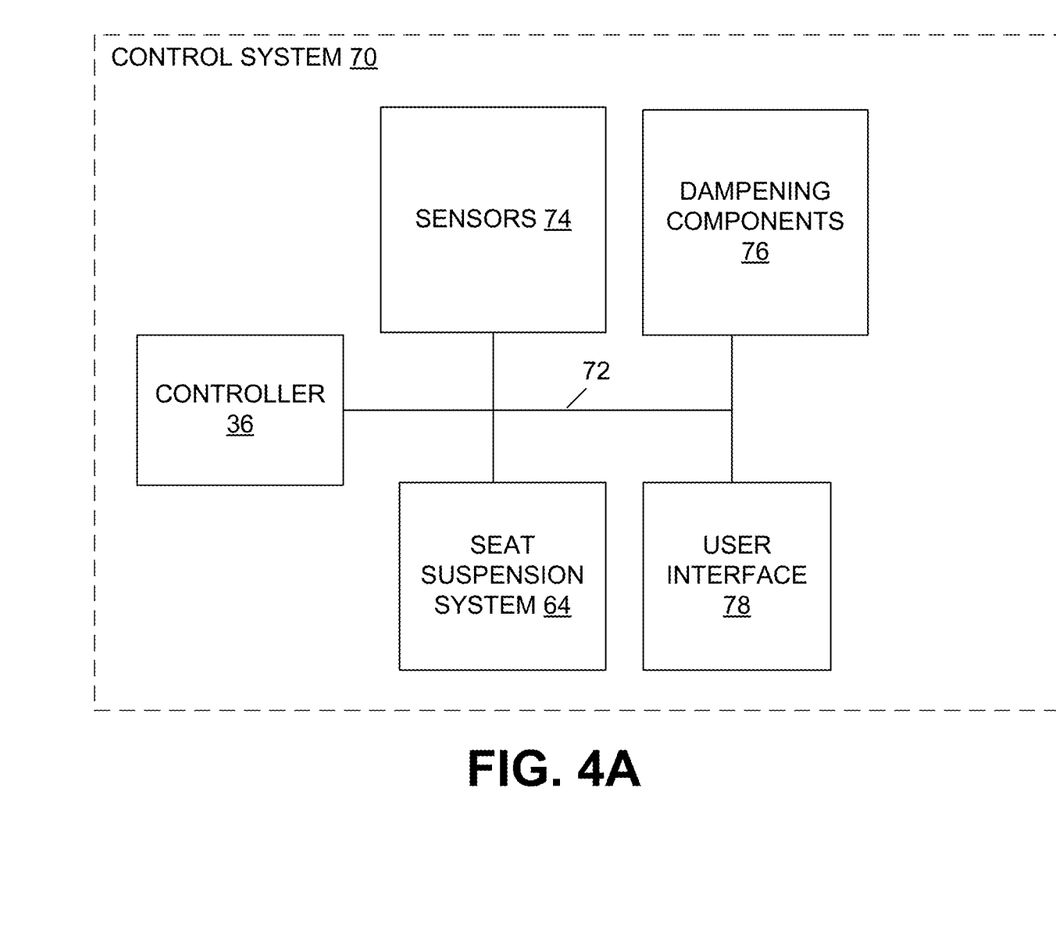
FIG. 4A is a block diagram of an embodiment of an example control system.

Having described an embodiment of an example windrower 10 having a semi-active suspension system, attention is directed to FIG. 4A, which illustrates an embodiment of an example control system 70 used for providing control and management of an semi-active suspension system. It should be appreciated within the context of the present disclosure that some embodiments may include additional components or fewer or different components, and that the example depicted in FIG. 4A is merely illustrative of one embodiment among others. Further, though depicted as residing entirely within the windrower 10, in some embodiments, the control system 70 may be distributed among several locations. For instance, the functionality of the controller 36 may reside all or at least partly at a remote computing device, such as a server that is coupled to the control system components over one or more wireless networks (e.g., in wireless communication with the windrower 10 via a radio frequency (RF) and/or cellular modems residing in the windrower 10). Further, though depicted using a single controller 36, in some embodiments, the control system 70 may be comprised of plural controllers. In the depicted embodiment, the controller 36 is coupled via one or more networks, such as network 72 (e.g., a CAN network or other network, such as a network in conformance to the ISO 11783 standard, also referred to as "Isobus"), to one or more sensors 74, one or more dampening components 76 (e.g., of the suspension control and dampening devices 24), the seat suspension system 64 (e.g., directly or indirectly to a controller of the seat suspension system), and user interface 78. Note that control system operations are primarily disclosed herein in the context of control via the single controller 36, with the understanding that additional controllers may be involved in one or more of the disclosed functionality in some embodiments. The sensors 74 include one or any combination of the accelerometers 60, GNSS receiver 26, pressure sensors 62, among other sensors, including position sensors. The sensors 74 monitor motion (e.g., pitch, yaw, roll, vertical accelerations, etc.) of the cab 16 (FIG. 1). The sensors 74 may be embodied as contact (e.g., electromechanical sensors, such as position sensors, strain gauges, pressure sensors, etc.) and non-contact type sensors (e.g., photo-electric, inductive, capacitive, ultrasonic, etc.), all of which comprise known technology. The dampening component 76 of the suspension control and dampening devices 24 has been described previously, and hence description of the same is omitted here for brevity. The seat suspension system 64 comprises a controller (e.g., microprocessor), an input/output interface (e.g., configured for communication over a bus), one or more sensors, such as of the type described in association with sensors 74, and optionally a network interface (e.g., enabling wireless communication). The user interfaces 78 may include one or any combination of a keyboard, mouse, microphone, touch-type or non-touch-type display device, joystick, steering wheel, FNR lever, and/or other devices (e.g., switches, immersive head set, etc.) that enable input and/or output by an operator. For instance, in some embodiments, the user interfaces 78 may be used to present plural user-selectable firm-setting options on the screen for operator selection of the firmness of the cab suspension or ride (e.g., degrees of firmness, such as low, medium, high, or continuously variable) and optionally enabling adjustment of the seat suspension (e.g., with similar degrees and/or types of firmness adjustments). The control system 70 may include one or more additional components, such as a wireless network interface module (e.g., including an RF or cellular modem) for wireless communication among other devices of the windrower 10 or other communication devices located remote and/or external from the windrower 10. The wireless network interface module may working conjunction with communication software (e.g., including browser software) in the controller 36, or as part of another controller coupled to the network 72 and dedicated as a gateway for wireless communications to and from the network 72. The wireless network interface module may comprise MAC and PHY components (e.g., radio circuitry, including transceivers, antennas, etc.), as should be appreciated by one having ordinary skill in the art.

In one embodiment, the controller 36 is configured to receive and process information (e.g., one or more parameters) from the sensors 74 and the seat suspension system 64 (and/or information from the user interface 76), and communicate instructions (e.g., dampening values) to the dampening component 76 and seat suspension system 64 based on the input of information from the sensors 74, the seat suspension system 64, and the user interfaces 78. In some embodiments, the controller 36 may provide feedback of any automatic adjustment in firmness settings to the operator via the user interfaces 78.

Figure 4B:
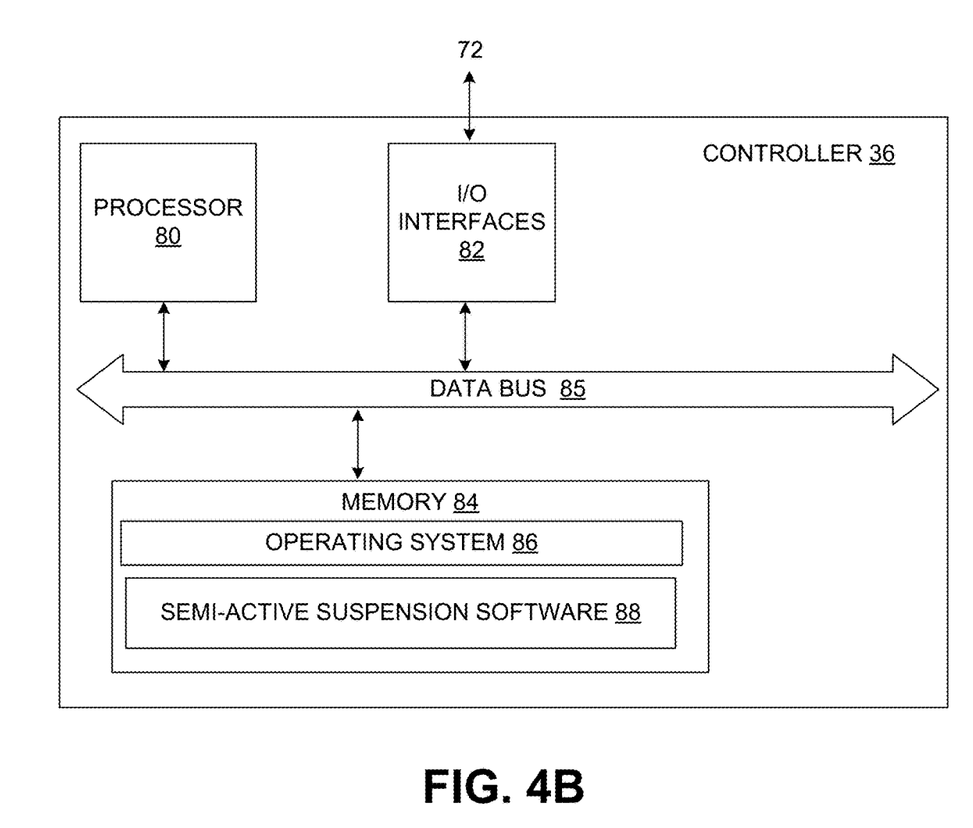
FIG. 4B is a block diagram of an embodiment of an example controller used in the control system of FIG. 4A

FIG. 4B further illustrates an example embodiment of the controller 36. One having ordinary skill in the art should appreciate in the context of the present disclosure that the example controller 36 is merely illustrative, and that some embodiments of controllers may comprise fewer or additional components, and/or some of the functionality associated with the various components depicted in FIG. 4B may be combined, or further distributed among additional modules, in some embodiments. It should be appreciated that, though described in the context of residing in the windrower 10 (FIG. 1), in some embodiments, the controller 36, or all or a portion of its corresponding functionality, may be implemented in a computing device or system located external to the windrower 10. Referring to FIG. 4B, with continued reference to FIG. 4A, the controller 36 or electronic control unit (ECU) is depicted in this example as a computer, but may be embodied as a programmable logic controller (PLC), field programmable gate array (FPGA), application specific integrated circuit (ASIC), among other devices. It should be appreciated that certain well-known components of computers are omitted here to avoid obfuscating relevant features of the controller 36. In one embodiment, the controller 36 comprises one or more processors (also referred to herein as processor units or processing units), such as processor 80, input/output (I/O) interface(s) 82, and memory 84, all coupled to one or more data busses, such as data bus 85. The memory 84 may include any one or a combination of volatile memory elements (random-access memory RAM, such as DRAM, and SRAM, etc.) and nonvolatile memory elements (e.g., ROM, Flash, hard drive, EPROM, EEPROM, CDROM, etc.). The memory 84 may store a native operating system, one or more native applications, emulation systems, or emulated applications for any of a variety of operating systems and/or emulated hardware platforms, emulated operating systems, etc.

In the embodiment depicted in FIG. 4B, the memory 84 comprises an operating system 86 and semi-active suspension software 88. It should be appreciated that in some embodiments, additional or fewer software modules (e.g., combined functionality) may be deployed in the memory 82 or additional memory. In some embodiments, a separate storage device may be coupled to the data bus 85, such as a persistent memory (e.g., optical, magnetic, and/or semiconductor memory and associated drives).

The semi-active suspension software 88 receives sensor input from one or more sensors 74 and input from the seat suspension system 64 via the I/O interfaces 82 (from the network 72). The sensor input comprises parameters corresponding to motion (e.g., pitch, yaw, roll, vertical accelerations, etc.) of the cab suspension, including amplitude of motion, frequency of motion. In some embodiments, the sensor input may comprise of pressure or position information, such as hydraulic pressure or position information associated with a sensor associated with the hydraulic actuators of the header float system. The semi-active suspension software 88 processes the plural inputs to derive a dampening value or values to communicate to the dampening components 76 and in some embodiments the seat suspension system 64. In one embodiment, the semi-active suspension software 88 compares the values received from the sensor input (note that hereinafter, reference to sensor input may include sensors embedded in, or associated with, the seat suspension system 64) in a look up table (e.g., stored in memory 84) that associates the parameters to a respective dampening value. In some embodiments, the parameters are used in a formula that the semi-active suspension software 88 computes to derive a dampening value. The dampening value may be based on a moving average (or other statistical values) of prior sensor and seat suspension system input (with the window of the moving average defined by a predetermined time and/or distance traveled by the windrower 10, FIG. 1), or continually updated in finer increments of time (e.g., as sensor input and seat suspension information is received) in some embodiments. Further, in some embodiments, dampening values may be continuously variable values or rounded up or down (or interpolated) to fixed incremental values in some embodiments. The semi-active suspension software 88 communicates the dampening value via the I/O interfaces 82 to the dampening components 76 and optionally the seat suspension system 64, which are used to cause a dampening (increased or decreased or both when applied to both the dampening components 76 and the seat suspension system 64) to the cab suspension and the seat suspension. For instance, the control signals cause adjustments to the settings of the dampening components 76 for the cab suspension.

In some embodiments, the user interfaces 82 may provide feedback of the changes to the cab and seat suspension. For instance, the feedback may be presented visually or audibly. The user interfaces 82 may also be used initially by the operator to set the ride. For instance, the operator may select one of plural ride settings (e.g., firmness), such as predetermined settings, or in some embodiments, may be presented with a dial (e.g., mechanical or graphical icon) that the operator manipulates to continuously and variably adjust the firmness of the ride. The operator input is communicated to the semi-active suspension software 88, which makes the adjustments to the firmness to the cab and/or seat suspension in a similar manner as expressed above. In some embodiments, the ride firmness is preset and the operator makes adjustments as he or she desires. In some embodiments, based on an identification of the field (e.g., via a GNSS input, operator entry, etc.), the semi-active suspension software 88 automatically makes a selection of the firmness based on a prior history of usage or a determination of the setting based on crop conditions and/or field conditions.

Execution of the semi-active suspension software 88 may be implemented by the processor 80 under the management and/or control of the operating system 86. The processor 80 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 36.

The I/O interfaces 82 provide one or more interfaces to the network 72 and other networks. In other words, the I/O interfaces 82 may comprise any number of interfaces for the input and output of signals (e.g., analog or digital data) for conveyance of information (e.g., data) over the network 72. The input may comprise input by an operator (local or remote) through the user interfaces 78 and input from signals carrying information from one or more of the components of the control system 70, such as the sensors 74 (including the sensors, either directly, or indirectly via intermediate components of the seat suspension system).

When certain embodiments of the controller 36 are implemented at least in part with software (including firmware), as depicted in FIG. 4B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 36 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
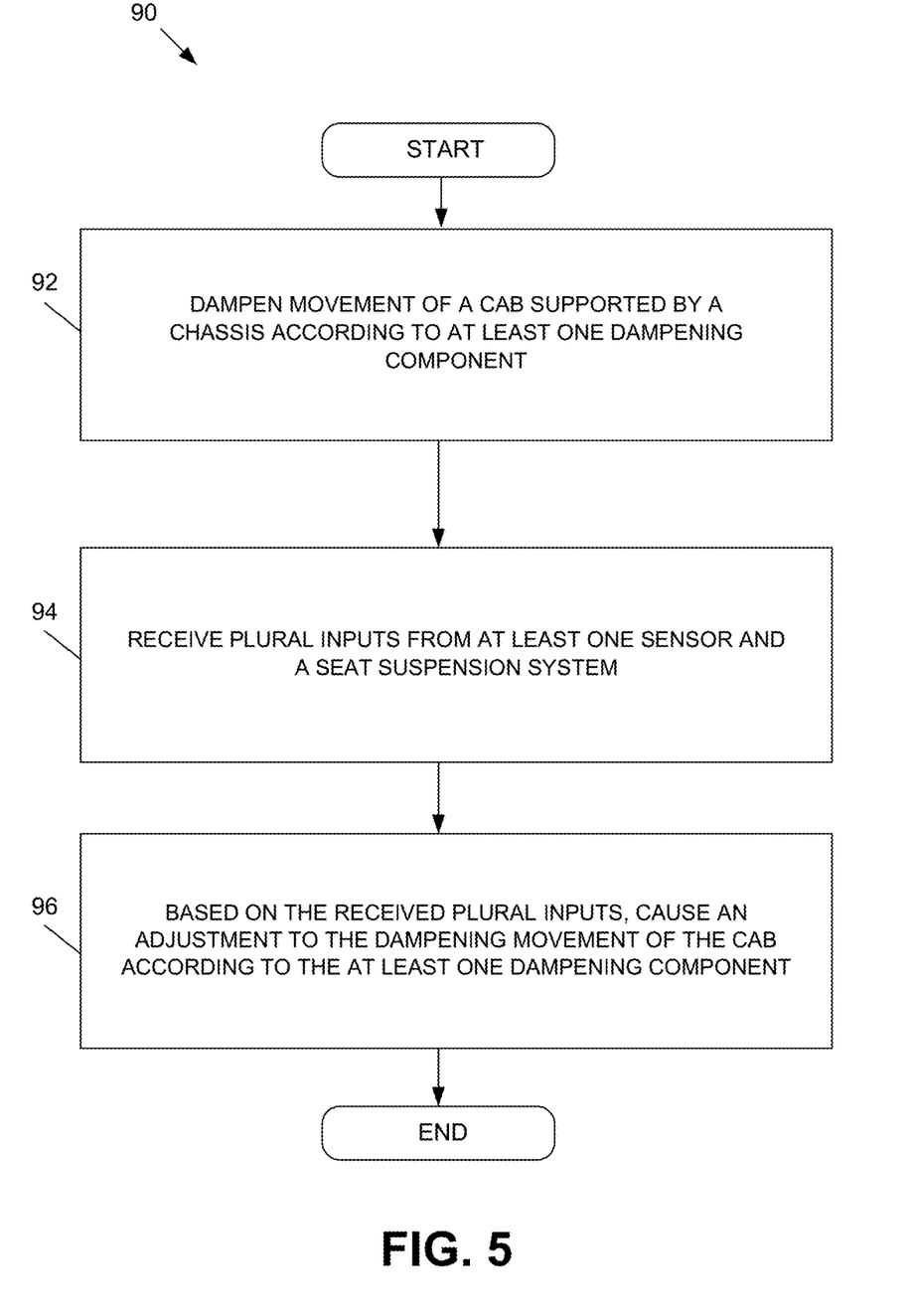
FIG. 5 is a flow diagram that illustrates an embodiment of an example semi-active suspension method.

In view of the above description, it should be appreciated that one embodiment of an active suspension method 90, depicted in FIG. 5 (and implemented in one embodiment by the semi-active suspension software 88, FIG. 4B), comprises dampening movement of a cab supported by a chassis according to at least one dampening component (92); receiving plural inputs from at least one sensor and a seat suspension system (94); and based on the received plural inputs, causing an adjustment to the dampening movement of the cab according to the at least one dampening component (96).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

At least the following is claimed:

1. A windrower, comprising:
a cab;
a seat disposed within the cab and comprising a seat suspension system;
at least one suspension control component configured to control suspension and leveling for the cab;
at least one dampening component configured to dampen the at least one suspension control component for the cab;
a chassis with wheels coupled thereto for movement of the chassis over a ground surface, the cab mounted on the chassis;
a harvesting header mounted to the chassis, the harvesting header having a hydraulic header float system having at least one hydraulic cylinder configured to raise and lower the hydraulic header relative the ground surface;
at least one sensor, wherein the at least one sensor comprises a pressure sensor that senses hydraulic pressure in the at least one hydraulic cylinder associated with the header float system or a position sensor that senses displacement of the at least one hydraulic cylinder associated with a header float system; and
one or more controllers configured to:
receive a first input from the at least one sensor;
receive a second input from the seat suspension system; and
provide a control signal to the dampening component based on the received first and second inputs, the control signal causing an adjustment to the at least one dampening component such that movement of the cab is dampened according to the hydraulic pressure or the displacement of the at least one hydraulic cylinder of the harvesting header.

2. The windrower of claim 1, wherein the at least one dampening component comprises a magnetorheological fluid dampener, an electrorheological fluid dampener, an electrophoretic fluid dampener, or an adjustable hydraulic fluid dampener.

3. The windrower of claim 1, wherein the at least one sensor further comprises an accelerometer that senses the movement of the cab.

4. The windrower of claim 1, wherein the at least one sensor further comprises a global navigation satellite systems (GNSS) receiver that senses the movement of the cab.

5. The windrower of claim 1, wherein the one or more controllers are configured to provide the control signal with a variable dampening value or a dampening value selected from among plural predetermined dampening values to cause a corresponding change in a setting of the at least one dampening component.

6. The windrower of claim 1, wherein the one or more controllers are further configured to provide the control signal based on computation of a moving average of plural inputs from the at least one sensor and the seat suspension system over a predetermined period of time or distance traveled.

7. The windrower of claim 1, wherein the one or more controllers are further configured to provide an additional control signal to the seat suspension system, the additional control signal causing adjustments to the dampening movement of the seat.

8. The windrower of claim 7, further comprising a user interface coupled to the one or more controllers, wherein the user interface enables an operator to control the respective dampening movement of the cab and the seat.

9. The windrower of claim 1, further comprising a user interface coupled to the one or more controllers, wherein the user interface enables an operator to control the respective dampening movement of the cab.

10. A method, comprising:
   dampening movement of a cab supported by a chassis according to at least one dampening component;
   receiving plural inputs from at least one sensor and a seat suspension system, wherein the at least one sensor comprises a pressure sensor that senses header float pressure in a harvesting header or a position sensor that senses displacement of a hydraulic cylinder associated with a header float system of the harvesting header; and
   based on the received plural inputs, causing an adjustment to the at least one dampening component such that movement of the cab is dampened according to the header float pressure or the displacement of the hydraulic cylinder of the harvesting header.

* * * * *